(12) United States Patent
Kanasaki et al.

(10) Patent No.: US 7,733,278 B2
(45) Date of Patent: Jun. 8, 2010

(54) PORTABLE WIRELESS DEVICE

(75) Inventors: Yoshihiro Kanasaki, Ishikawa (JP); Akiyoshi Takeuchi, Ishikawa (JP); Yutaka Saito, Ishikawa (JP); Kouta Aoki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 229 days.

(21) Appl. No.: 11/817,512

(22) PCT Filed: Feb. 21, 2006

(86) PCT No.: PCT/JP2006/303012
§ 371 (c)(1),
(2), (4) Date: Aug. 31, 2007

(87) PCT Pub. No.: WO2006/092979
PCT Pub. Date: Sep. 8, 2006

(65) Prior Publication Data
US 2009/0033563 A1    Feb. 5, 2009

(30) Foreign Application Priority Data
Mar. 4, 2005    (JP) .............................. 2005-060787

(51) Int. Cl.
*H01Q 1/24* (2006.01)
(52) U.S. Cl. .................... 343/702; 455/575.4
(58) Field of Classification Search ........... 343/702, 343/846; 455/575.1, 575.3, 575.4, 575.7, 455/575.8, 90.1, 90.3
See application file for complete search history.

(56) References Cited
U.S. PATENT DOCUMENTS
7,106,260 B2 * 9/2006 Ryu et al. ................... 343/702

| | | | | |
|---|---|---|---|---|
| 7,162,284 B2 * | 1/2007 | Kobayashi et al. | ....... | 455/575.5 |
| 7,376,449 B2 * | 5/2008 | Mizuta et al. | ............ | 455/575.3 |
| 7,436,364 B2 * | 10/2008 | Nishikido et al. | ........... | 343/702 |
| 7,529,571 B2 * | 5/2009 | Byun et al. | .............. | 455/575.4 |

(Continued)

FOREIGN PATENT DOCUMENTS
JP          3-280625          12/1991

(Continued)

OTHER PUBLICATIONS
International Search Report Dated Apr. 4, 2006.

*Primary Examiner*—Hoang V Nguyen
(74) *Attorney, Agent, or Firm*—Pearne & Gordon LLP

(57) ABSTRACT

A portable wireless device is provided that eliminates the need for an antenna protruding from an housing by including a first housing and a second housing operating as a dipole antenna thus ensuring portability and delivering a high antenna performance despite its compact, low-profile and lightweight design.

The portable wireless device according to the invention includes a first housing 1; a second housing 2; and a sliding unit 21 for slidably coupling the first housing 1 and the second housing 2 to each other; wherein the first housing 1 is arranged a predetermined spacing apart from the second housing 2 and includes a power feeding unit 7 for feeding power: between the first housing 1 and the second housing 2 and wherein the first housing 1 and the second housing 2 operate as a dipole antenna. The portable wireless device does not include an antenna protruding from an housing. This ensures portability and delivers a high antenna performance despite its compact, low-profile and lightweight design.

5 Claims, 8 Drawing Sheets

U.S. PATENT DOCUMENTS

2005/0124394 A1 * 6/2005 Kim et al. ................ 455/575.3
2005/0239519 A1 * 10/2005 Saitou et al. ............. 455/575.1

FOREIGN PATENT DOCUMENTS

| JP | 2003-309631 | 10/2003 |
| JP | 2004-172919 | 6/2004 |
| JP | 2004-242202 | 8/2004 |
| JP | 2004-266688 | 9/2004 |
| JP | 2004-304346 | 10/2004 |
| JP | 2005-6091 | 1/2005 |
| JP | 2005-6096 | 1/2005 |
| JP | 2005-6097 | 1/2005 |
| JP | 2004-297337 | 9/2007 |

* cited by examiner

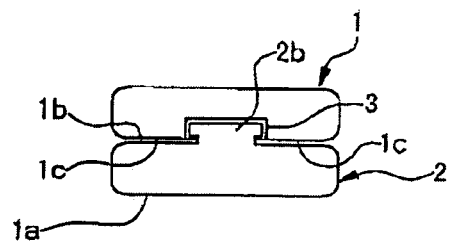
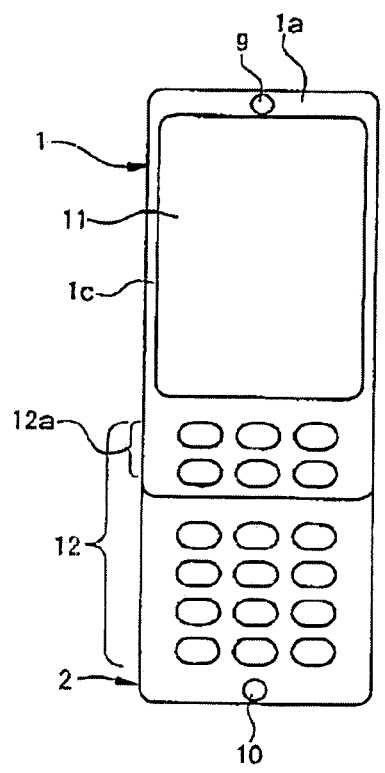
FIG. 1(d)
FIG. 1(c)  FIG. 1(b)  FIG. 1(a)

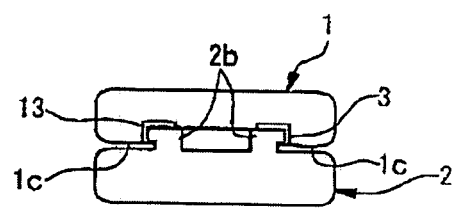
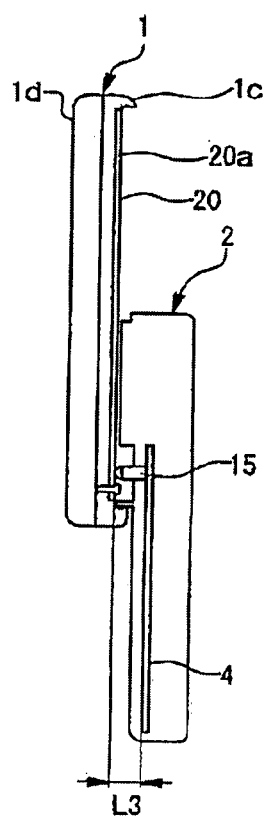
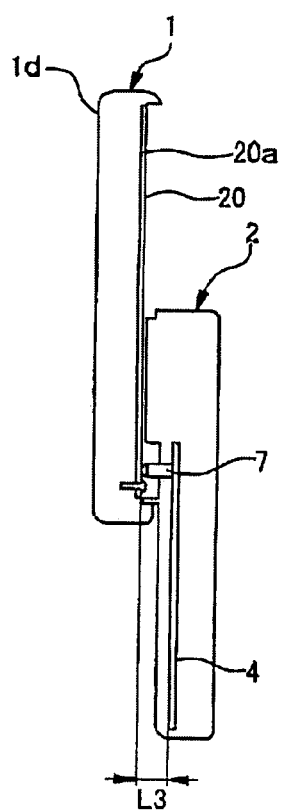
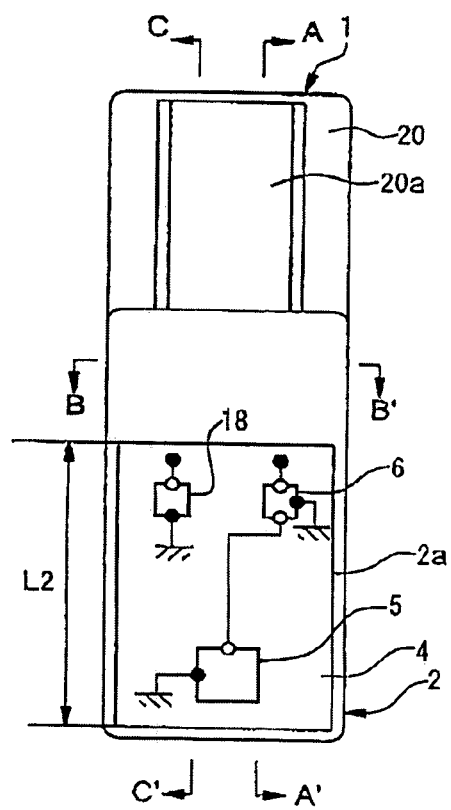

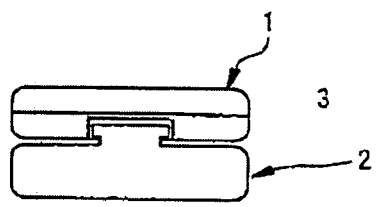
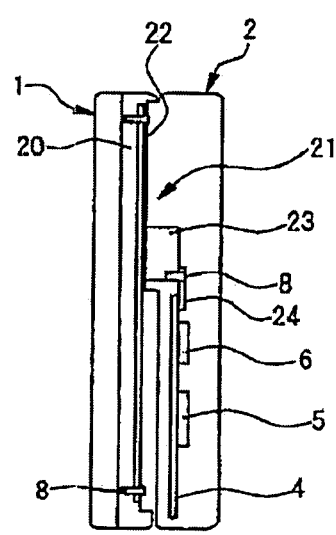
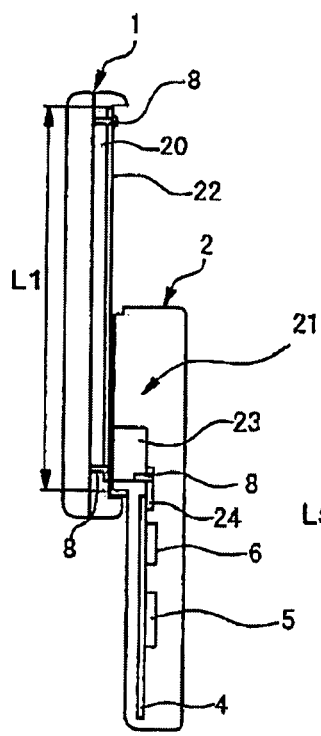
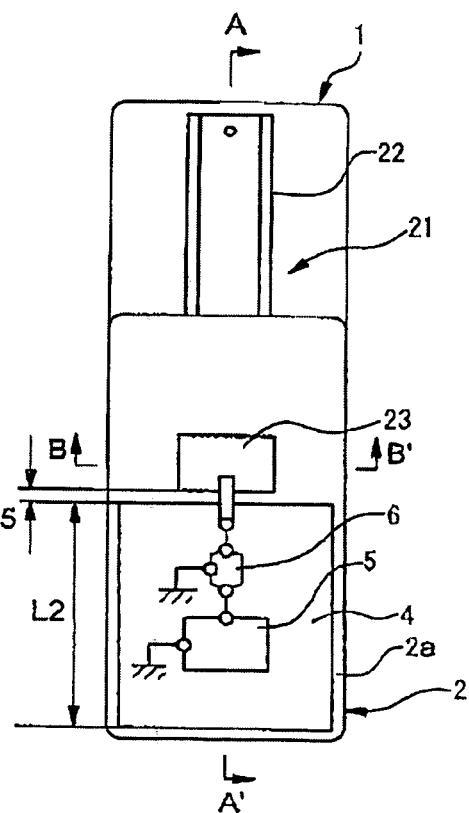
FIG. 8(d)
FIG. 8(c)    FIG. 8(b)    FIG. 8(a)

PORTABLE WIRELESS DEVICE

This application is a 371 of PCT/2006/303012 dated Feb. 21, 2006.

TECHNICAL FIELD

The present invention relates to a sliding type portable wireless device including two housings sliding with respect to each other to elongate/contract the device.

BACKGROUND ART

A sliding type cell phone generally has a telescopic mechanism and includes a first housing and a second housing coupled to each other slidably on a rail part. The cell phone advantageously includes a large display screen on the first housing and a key operation part on the second housing thus allowing key operation while browsing the large screen in an elongated state. Moreover, in a contracted state, the key operation part is housed in the cell phone thus preventing operation errors and allowing the cell phone to be carried along in a compact shape.

As an antenna used for such a sliding type portable wireless device, a helical antenna or a telescopic antenna is known (for example, refer to Patent Reference 1).

Patent Reference 1: JP-A-2003-309631 (Page 5, FIGS. 1 to 4)

DISCLOSURE OF THE INVENTION

Problems that the Invention is to Solve

A cell phone including the above-mentioned related art antenna is disadvantageous in that a protruding antenna is likely to be caught in a pocket in an attempt to take out the cell phone.

A whip antenna requires a receiving space, which hampers downsizing of the cell phone.

The invention has been accomplished in order to solve the above problems. An object of the invention is to provide a portable wireless device that delivers a high antenna performance despite its compact, low-profile and lightweight design.

Means for Solving the Problems

The invention provides a portable wireless device comprising: a first housing; a second housing; and a sliding unit for slidably coupling the first housing and the second housing to each other; wherein the first housing is arranged a predetermined spacing apart from the second housing and includes a power feeding unit for feeding power between the first housing and the second housing and wherein the first housing and the second housing operate as a dipole antenna.

With this configuration, an antenna does not protrude from an housing so that the portability is provided. By using the first housing and the second housing as an antenna, a high antenna performance is delivered despite a compact, low-profile and lightweight design.

The invention provides a portable wireless device wherein the first housing includes a rail formed of a conductive metal for slidably supporting the second housing, wherein the second housing includes a power feeding unit including therein a circuit board having a ground pattern and a power feeding unit for feeding power between the rail and the circuit board, wherein the rail is arranged a predetermined spacing apart from the ground pattern on the circuit board, and wherein the rail and the ground pattern operate as a dipole antenna.

With this configuration, an antenna does not protrude from an housing so that the portability is provided. The sliding type portable wireless device feeds power to the rail and uses the rail as a portion of an antenna. This eliminates the need for parts dedicated to an antenna so that a high antenna performance is delivered despite a compact, low-profile and lightweight design.

The invention provides a portable wireless device comprising a plurality of the rails arranged a predetermined spacing apart from each other and a switching unit for selecting to electrically connect or electromagnetically couple a wireless part on the circuit board and one of the plurality of the power feeding unit to each other.

With this configuration, by switching between a rail to which power is fed, a space diversity effect is obtained.

Further, the invention provides a portable wireless device wherein the rail is electrically connected or electromagnetically coupled to an antenna element provided on the first housing.

With this configuration, the effective area of an antenna is increased and the radiation resistance is enhanced, thus obtaining a high-efficiency and broadband antenna.

The invention provides a portable wireless device wherein the sliding unit includes a first sliding part and a second sliding part made of a conductive metal and coupled to each other in a slidable fashion, wherein the first sliding part is provided on the first housing and electrically connected to the end of the antenna element where the antenna element is overlaid on the second housing, wherein the second sliding part is provided on the second housing and is electrically connected to a power feeding part arranged a predetermined spacing apart from the ground pattern on the circuit board and connected to a wireless circuit on the circuit board, and wherein the antenna element, the sliding unit and the ground pattern operate as an dipole antenna.

With this configuration, the antenna element and the sliding unit operate as a first antenna element and the ground pattern operates as a second antenna element. In other words, in a state that the first housing and the second housing are elongated, the antenna elements, sliding means and the ground pattern on the circuit board 4 operate as a dipole antenna including larger antenna elements. This provides a broadband antenna with high antenna efficiency.

ADVANTAGE OF THE INVENTION

The invention does not include a protruding antenna part because the first and second housings operate as a dipole antenna. Thus, the invention provides an advantageous portable wireless device that ensures portability and delivers a high antenna performance despite its compact, low-profile and lightweight design.

BRIEF DESCRIPTION OF THE DRAWINGS

FIG. 1(a) is a rear view of a portable wireless device according to the first embodiment of the invention;

FIG. 1(b) is a cross-sectional view of the portable wireless device along line A-A';

FIG. 1(c) is a front view of the portable wireless device;

FIG. 1(d) is a cross-sectional view of the portable wireless device along line B-B';

FIG. 7(a) is a rear view of a portable wireless device according to the fifth embodiment of the invention;

FIG. 7(b) is a cross-sectional view of the portable wireless device along line A-A';

FIG. 7(c) is a cross-sectional view of the portable wireless device along line C-C';

FIG. 7(d) is a cross-sectional view of the portable wireless device along line B-B';

FIG. 8(a) is a rear view of a portable wireless device;

FIG. 8(b) is a cross-sectional view of the portable wireless device along line A-A';

FIG. 8(c) is a cross-sectional view of the portable wireless device in an accommodated state along line A-A'; and FIG. 8(d) is a cross-sectional view of the portable wireless device along line B-B'.

DESCRIPTION OF REFERENCE NUMERALS AND SIGNS

Figures 2A, 2B:
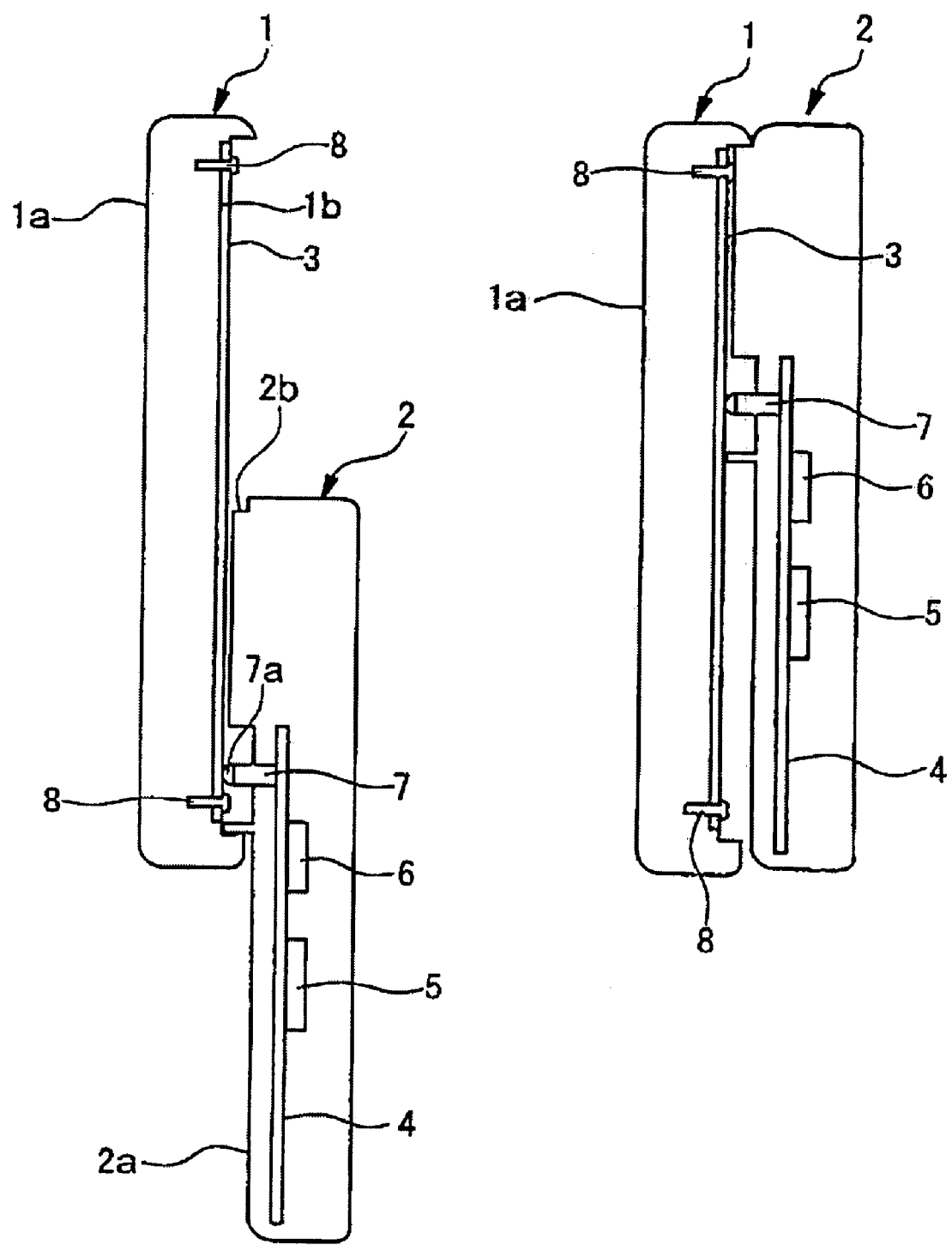
FIG. 2(a) is a cross-sectional view showing the portable wireless device in an elongated state.
FIG. 2(b) is a cross-sectional view showing the portable wireless device in an accommodated state.
Figure 3D:
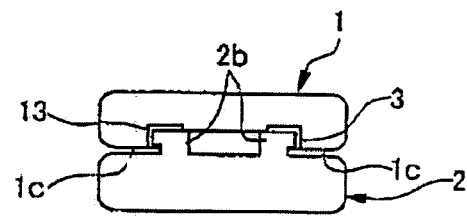
FIG. 3(d) is a cross-sectional view of the portable wireless device along line B-B'.
Figure 3C:
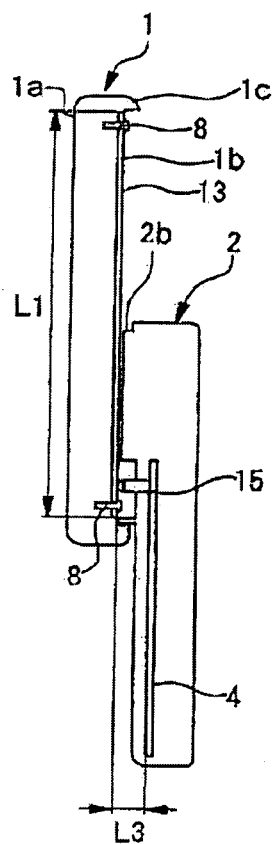
FIG. 3(c) is a cross-sectional view of the portable wireless device along line C-C'.
Figure 3B:
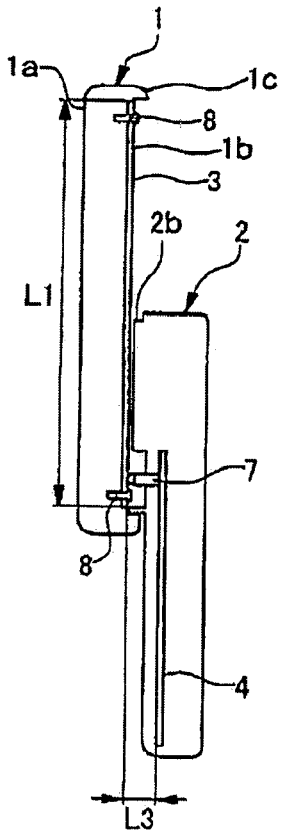
FIG. 3(b) is a cross-sectional view of the portable wireless device along line A-A'.
Figure 3A:
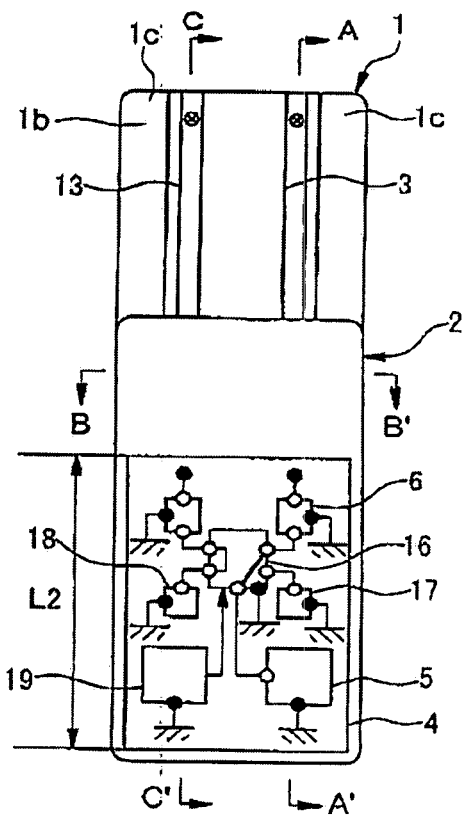
FIG. 3(a) is a rear view of a portable wireless device according to the second embodiment of the invention.

1: First housing
2: Second housing
3: Rail
4: Circuit board
5: Wireless circuit (wireless part)
7: Power feeding pin (power feeding unit)
20; Antenna element (metallic frame)
21: Sliding unit

BEST MODE FOR CARRYING OUT THE INVENTION

First Embodiment

A schematic view of a portable wireless device according to the first embodiment of the invention is shown in FIG. 1. FIG. 1(a) is a rear view of the portable wireless device. FIG. 1(b) is a cross-sectional view of the portable wireless device along line A-A'. FIG. 1(c) is a front view of the portable wireless device. FIG. 1(d) is a cross-sectional view of the portable wireless device along line B-B'.

Referring to FIG. 1, a portable wireless device according to the first embodiment of the invention comprises a first housing 1, a second housing 2, and a rail 3 as a sliding unit 21 for slidably coupling the first housing 1 and the second housing 2, wherein the first housing 1 is arranged a predetermined spacing apart from the second housing 2 and includes a power feeding pin 7 as a power feeding unit for feeding power between the first housing 1 and the second housing 2 and wherein the first housing 1 and the second housing 2 operate as a dipole antenna.

That is, the first housing 1 includes a rail 3 formed of a conductive metal for supporting the second housing 2 in a slidable fashion and the second housing 2 includes therein a circuit board 4 having a ground pattern as well as a power feeding pin 7 for feeding power between the rail 3 and the circuit board 4. The rail 3 is arranged a predetermined spacing apart from the ground pattern on the circuit board 4 and the rail 3 and the ground pattern operate as a dipole antenna.

A plurality of (for example two) rails 3 are arranged a predetermined spacing apart from each other. A switching unit (high-frequency switch 16, refer to FIG. 3) is provided for selecting to electrically connect or electromagnetically couple a wireless circuit 5 as a wireless portion of the circuit board 4 or a plurality of power feeding pins 7 and 15.

The rails 3 are electrically connected or electromagnetically coupled to an antenna element (metal frame 20, refer to FIG. 5) provided on the first housing 1.

As described above, the portable wireless device according to this embodiment has an advantage that the first housing 1 and the second housing 2 operate as a dipole antenna thus eliminating the need for an antenna part protruding from the housings 1, 2. This ensures portability and delivers a high antenna performance despite its compact, low-profile and lightweight design.

The portable wireless device according to the first embodiment of the invention will be described referring to FIGS. 1 and 2 above. FIG. 2(a) is a cross-sectional view showing the portable wireless device in an elongated state. FIG. 2(b) is cross-sectional view showing the portable wireless device in an accommodated state.

The first housing 1 and the second housing 2 are generally made of a lightweight material such as an ABS resin.

The first housing 1 includes a rail 3, a speech receiver part 9 for outputting the speech from a distant party, a display part 11, and a portion 12a of an operation key part 12. The speech receiver part 9, the display part 11, and the portion of the operation key part 12 are embedded in the first housing 1 and mechanically fixed.

The second housing 2 includes a circuit board 4 having a ground pattern, a speech transmitter part 10 including a microphone for acquiring the speech of the user, and an operation key part 12. The circuit board 4, the speech transmitter part 10 and the operation key part 12 are pinched by ribs 2a as a portion of the second housing 2 and mechanically fixed.

The rail 3 is formed of a conductive metal. The rail 3 is mounted on a surface 1b opposite to a surface 1a of the first housing 1 on which the display part 11 is arranged. The rail 3 is mechanically fixed to the first housing 1 with a rib 1c as a portion of the first housing 1 and a mounting screw 8.

The rail 3 is fitted to a portion 2b of the second housing 2 and thus forms a structure allowing the first housing 1 and the second housing 2 to slide in a telescopic fashion as shown in FIGS. 2(a) and 2(b). The first housing 1 and the second housing 2 may be in an elongated state or in an accommodated state.

In the elongated state, the user may browse a screen appearing on the display part 11, manipulate the operation key part 12, or place a call. In the accommodated state, the key operation part 12 is accommodated and the portable wireless device may be carried along in a compact shape. The display part 11 is not accommodated even in the accommodated state, so that e-mails and the web may be browsed with ease. A sound hole as an opening in the speech receiver part 9 inside the first housing 1 is oriented to the user while the portable wireless device is elongated during conversation.

The circuit board 4 is a printed circuit board on which a wireless circuit 5, a matching circuit 6, a power feeding pin 7 and other circuit components providing various features of a portable wireless device and forms a ground pattern on the nearly entire surface thereof. The circuit board 4 is mechanically fixed to the second housing 2 by way of the rib 2a as a portion of the second housing 2.

The wireless circuit 5 is mounted on the circuit board 4 and includes the transmission and reception features of a portable wireless device. Signals of the wireless circuit 5 used for transmission/reception are connected to the matching circuit 6 via the conductor pattern on the circuit board 4.

The matching circuit 6 is mounted on the circuit board 4 and is connected to the wireless circuit 5 and the power feeding pin 7 via the conductor pattern on the circuit board 4.

The power feeding pin 7 is mounted on a surface opposite to the surface on which the wireless circuit 5 of the circuit board 4 and is connected to the matching circuit 6 via an inner layer conductor pattern of the circuit board 4. The tip 7a of the power feeding pin 7 has a spring structure and is pressed against the rail 3 in a telescopic fashion and thus the power feeding pin 7 and the rail 3 are electrically connected to each other. With this structure, electrical connection is maintained while the contact position of the power feeding pin 7 and the rail 3 moves as the first housing and the second housing is elongated/contracted.

On the portable wireless device thus configured, the rail 3 operates as a first antenna element having a length L1 (for example 90 mm). The ground pattern on the circuit board 11 whose length is L2 (for example 90 mm) operates as a second antenna element. That is, In the state where the housings are elongated, the rail 3 and the ground pattern on the circuit board 4 operate as a dipole antenna.

The impedance of the antenna is matched to the input impedance (generally 50Ω) of the wireless circuit 5 by way of the matching circuit 6.

According to the first embodiment, a power feeding structure is provided without using a power feeding wire or a conductor pattern on a flexible printed board. This provides a high antenna performance without degradation in the antenna performance caused by concentrating of antenna currents onto a power feeding system.

In FIG. 1(b), it is desirable to maximize the spacing L3 between the rail 3 and the ground pattern on the circuit board 4, for example 2 mm or more at 2 GHz, in order to secure the antenna gain.

In FIG. 1(b), it is desirable to minimize the length L3 where the rail 3 is overlapped on the circuit board 4, for example 10 mm or less at 2 GHz, or eliminate the overlap, in order to secure the antenna gain.

Second Embodiment

A portable wireless device according to the second embodiment of the invention will be described referring to drawings.

Figure 4:
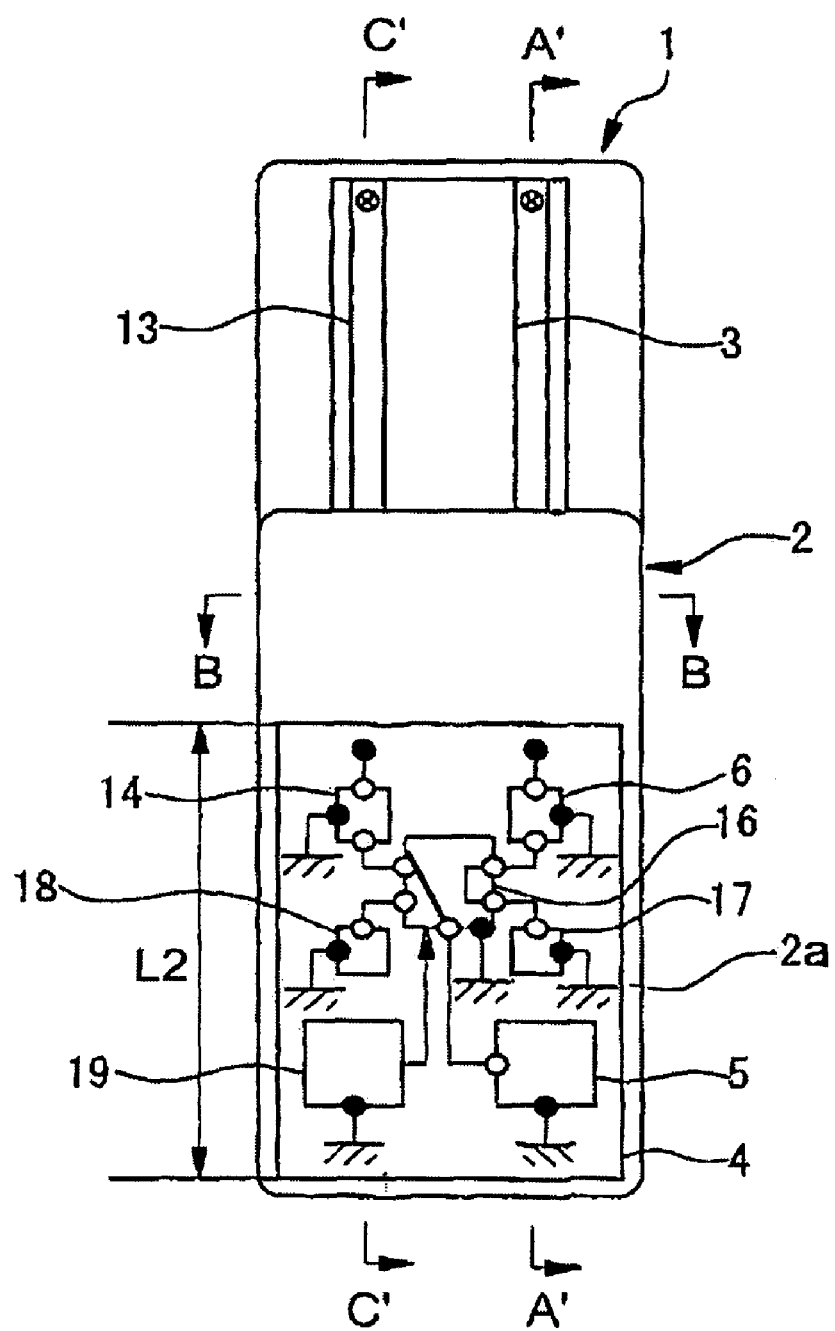
FIG. 4 is a cross-sectional view of a portable wireless device according to the second embodiment of the invention with a selection unit switched along line A-A'.
Figure 5D:
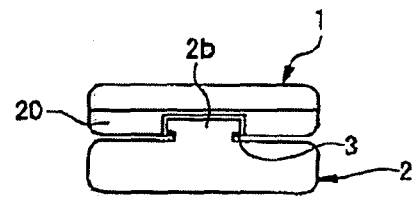
FIG. 5(d) is a cross-sectional view of the portable wireless device along line B-B'.
Figure 5C:
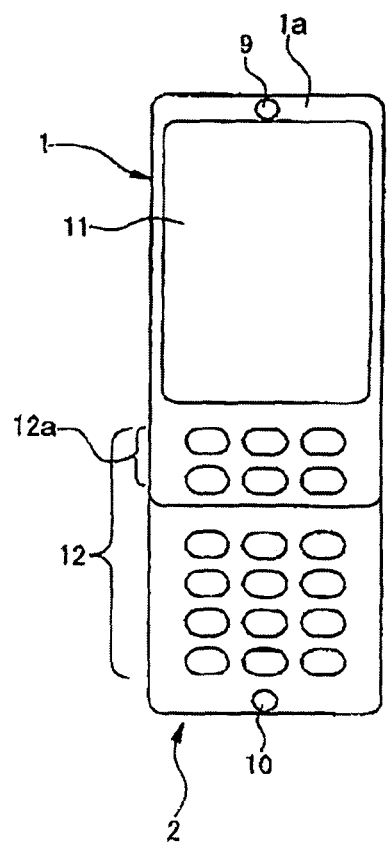
FIG. 5(c) is a cross-sectional view of the portable wireless device along line C-C'.
Figure 5B:
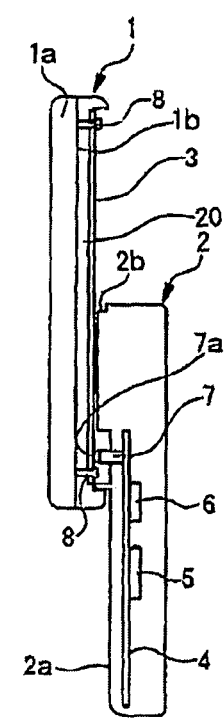
FIG. 5(b) is a cross-sectional view of the portable wireless device along line A-A'.
Figure 5A:
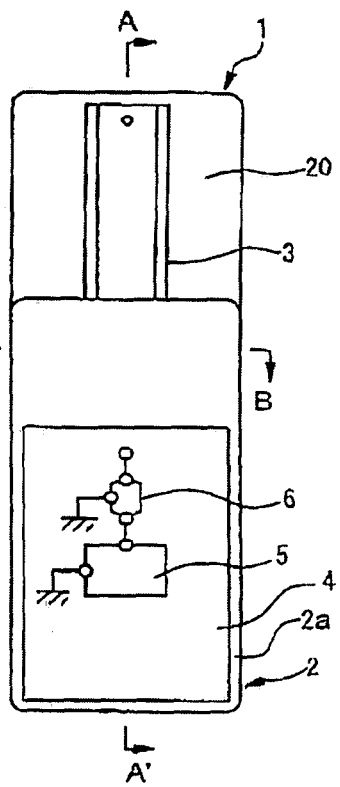
FIG. 5(a) is a rear view of a portable wireless device according to the third embodiment of the invention.
Figure 6D:
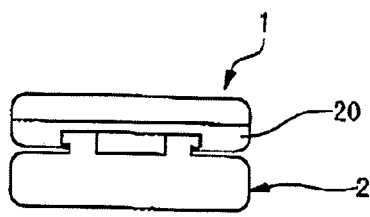
FIG. 6(d) is a cross-sectional view of the portable wireless device along line B-B'.
Figure 6C:
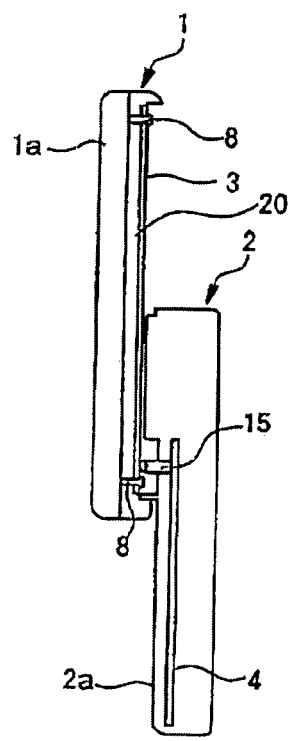
FIG. 6(c) is a cross-sectional view of the portable wireless device along line C-C'.
Figure 6B:
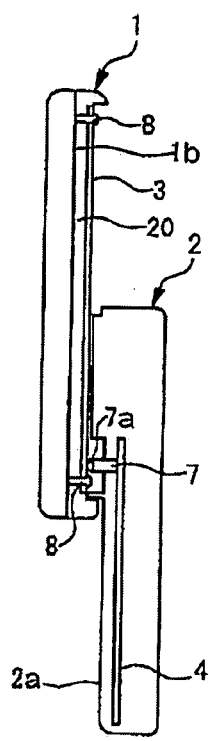
FIG. 6(b) is a cross-sectional view of the portable wireless device along line A-A'.
Figure 6A:
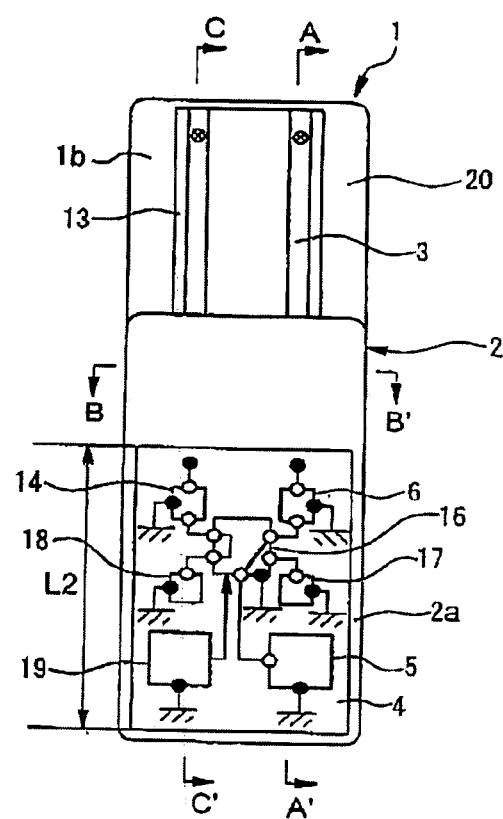
FIG. 6(a) is a rear view of a portable wireless device according to the fourth embodiment of the invention.

A schematic view of the portable wireless device according to the second embodiment of the invention is shown in FIG. 3. FIG. 3(a) is a rear view of the portable wireless device. FIG. 3(b) is a cross-sectional view of the portable wireless device along line A-A'. FIG. 3(c) is a cross-sectional view of the portable wireless device along line C-C'. FIG. 3(d) is a cross-sectional view of the portable wireless device along line B-B'. FIG. 4 is a rear view of the portable wireless device with a selection unit switched.

A component of the portable wireless device same as that of the first embodiment is given the same numeral and the overlapping description is omitted.

A second rail 13 is formed of a conductive metal, same as the rail 3. The rail 3 and the second rail 13 are mounted on a surface 1b opposite to a surface 1a of the first housing 1 on which the display part 11 is arranged. The rail 3 and the second rail 13 are mechanically fixed to the first housing 1 with a rib 1c as a portion of the first housing 1 and a mounting screw 8.

The rail 3 and the second rail 13 are fitted to a portion 2b of the second housing 2 and thus form a structure allowing the first housing 1 and the second housing 2 to slide in a telescopic fashion as shown in FIG. 2. The first housing 1 and the second housing 2 may be in an elongated state or in an accommodated state.

A second matching circuit 14 is mounted on a circuit board 4 and is connected to the second rail 13 via a conductor pattern on the circuit board 4 and a second power feeding pin 15. A high-frequency switch 16 as a switching unit is a high-frequency switch IC mounted on the circuit board 4.

A controller 19 mounted on the circuit board 4 is a circuit including a CPU and a memory that controls the entire portable wireless device. The controller 19 transmits a control signal to the high-frequency switch in accordance with a receiving field strength or a BER (Bit Error Rate).

The high-frequency switch 16 selects between a state where a wireless part 5 is electrically connected to a matching circuit 6 and a second reactance circuit 18 is electrically connected to a second matching circuit 14 as shown in FIG. 3, and a state where the wireless part 5 is electrically connected to the second matching circuit 14 and a reactance circuit 17 is electrically connected to the matching circuit 6 as shown in FIG. 4, by way of a control signal from the controller 19.

With this approach, the second rail 13 is terminated at the second reactance circuit 17 in case power is supplied to the rail 3 and the rail 3 is terminated at second reactance circuit 17 in case power is supplied to the second rail 13.

With this configuration, by feeding power to one of the rails 3 and 13 as appropriate, a space diversity effect is obtained.

The second embodiment differs from the first embodiment in that two rails, the rail 3 and the rail 13, are included, that the high-frequency switch 16 as a switching unit is included, and that power is supplied to either the rail 3 or 13 and the second reactance circuit 17 is connected to the rail 3 or 13 to whichever power is not supplied.

Third Embodiment

A portable wireless device according to the third embodiment of the invention will be described referring to drawings.

A schematic view of the portable wireless device according to the third embodiment of the invention is shown in FIG. 5. FIG. 5(a) is a rear view of the portable wireless device. FIG. 5(b) is a cross-sectional view of the portable wireless device along line A-A'. FIG. 5(c) is a cross-sectional view of the portable wireless device along line C-C'. FIG. 5(d) is a cross-sectional view of the portable wireless device along line B-B'.

A component of the portable wireless device same as that of the first and second embodiments is given the same numeral and the overlapping description is omitted.

A metallic frame 20 constitutes a portion of the first housing 1. The first housing 1 includes a resin case and the metallic frame 20 fitted to each other. The metallic frame 20 is in close proximity to the rail 3 (for example 0.3 mm or less) so that they may be the to be coupled electrically or electromagnetically to each other.

With this configuration, the housings 1 and 2 in an elongated state may operate as a dipole antenna with the metallic frame 20 and the rail 3 functioning as a first antenna element and the ground pattern on the circuit board 4 functioning as a second antenna element. In other words, a broadband antenna with high antenna efficiency is obtained by including a large antenna element covering the surface on the display part side of the first housing 1 such as the metallic frame 20.

The third embodiment differs from the first embodiment in that the metallic frame 20 as an antenna element is included.

Fourth Embodiment

A portable wireless device according to the fourth embodiment of the invention will be described referring to drawings.

A schematic view of the portable wireless device according to the fourth embodiment of the invention is shown in FIG. 6. FIG. 6(a) is a rear view of the portable wireless device. FIG. 6(b) is a cross-sectional view of the portable wireless device along line A-A'. FIG. 6(c) is a cross-sectional view of the portable wireless device along line C-C'. FIG. 6(d) is a cross-sectional view of the portable wireless device along line B-B'.

A component of the portable wireless device same as that of the first to third embodiments is given the same numeral and the overlapping description is omitted.

As shown in FIG. 6, with two rails 3, 13 and a metallic frame 20 included, switching a power feeding point with the high-frequency switch 16 can switch the antenna irradiation pattern and the main polarization thus obtaining a diversity effect.

The fourth embodiment differs from the second embodiment in that the metallic frame 20 as an antenna element is included.

Fifth Embodiment

A portable wireless device according to the fifth embodiment of the invention will be described referring to drawings.

A schematic view of the portable wireless device according to the fifth embodiment of the invention is shown in FIG. 7. FIG. 7(a) is a rear view of the portable wireless device. FIG. 7(b) is a cross-sectional view of the portable wireless device along line A-A'. FIG. 7(c) is a cross-sectional view of the portable wireless device along line C-C'. FIG. 7(d) is a cross-sectional view of the portable wireless device along line B-B'.

A component of the portable wireless device same as that of the first to fourth embodiments is given the same numeral and the overlapping description is omitted.

The antenna element of this embodiment is a metallic frame 20 as a portion of the first housing 1. The first housing 1 include a resin case 1d and the metallic frame 20 fitted to each other.

In this embodiment, the first housing 1 is made of the same material as that of the metallic frame 20 and is integrated with the metallic frame 20. A second power feeding pin 15 is connected to a second reactance circuit 18 not via a high-frequency switch 16 (refer to FIG. 3) or a second matching circuit 14 (refer to FIG. 3).

With this configuration, a larger antenna element is provided thus obtaining a broadband antenna with high antenna efficiency.

The fifth embodiment differs from the first embodiment in that two rails are included, that an antenna element is included and that a reactance circuit is included.

Sixth Embodiment

A portable wireless device according to the sixth embodiment of the invention will be described referring to drawings.

A schematic view of the portable wireless device according to the sixth embodiment of the invention is shown in FIG. 8. FIG. 8(a) is a rear view of the portable wireless device. FIG. 8(b) is a cross-sectional view of the portable wireless device along line A-A'. FIG. 8(c) is a cross-sectional view of the portable wireless device along line A-A'. FIG. 8(d) is a cross-sectional view of the portable wireless device along line B-B'.

A component of the portable wireless device same as that of the first to fifth embodiments is given the same numeral and the overlapping description is omitted.

The portable wireless device shown in FIG. 8 comprises a first housing 1 and a second housing 2 coupled to each other in a slidable fashion via a sliding unit 21, a metallic frame 20 as an antenna element provided on the first housing 1, a circuit board 4 having a ground pattern provided inside the second housing 2, and a feeding metallic fixture 24 as a power feeding part connected to a wireless part 5 on the circuit board 4.

The sliding unit 21 includes a first sliding part 22 and a second sliding part 23 made of a conductive metal and coupled slidably to each other. The first sliding part 22 is provided on the first housing 1 and is electrically connected to the end of the metallic frame 20 as the antenna element overlapping on the second housing 2. The second sliding part 23 is provided on the second housing 2 and is arranged a predetermined spacing apart from the ground pattern on the circuit board 4 and is electrically connected to a power feeding metal 24 as a power feeding part connected to the wireless circuit 5 of the circuit board 4. Thus, the metallic frame 20, the sliding unit 21 and the ground pattern operate as a dipole antenna.

The first sliding part 22 and the second sliding part 23 are electrically connected or electromagnetically coupled to each other respectively in a slidable state. The first housing 1 and the first sliding part 22 are mechanically fixed to each other with a mounting screw 8. The second housing 2 and the second sliding part 23 are mechanically fixed to each other. The metallic frame 20 and the first sliding part 22 are electrically connected or electromagnetically coupled to each other.

It is desirable to maximize the spacing L5 (refer to FIG. 8) between the second sliding part 23 and the ground pattern on the circuit board 4, for example 2 mm or more at 2 GHz, in order to secure the antenna gain.

The second sliding part 23 has a feeding metallic fixture 24 mounted thereon with a mounting screw 8, which is electrically connected upon contact with the second sliding part 23. With the arrangement of the sliding unit 21, the first housing 1 is slidably supported and the metallic frame 20 and the feeding metallic fixture 8 are electrically connected or electromagnetically coupled to each other via the sliding unit 21.

The feeding metallic fixture 8 is connected to the matching circuit 6 and the wireless circuit 5 on the circuit board 4 arranged inside the second housing 2 for example via a spring contact or soldering.

With this embodiment arranged as described above, the metallic frame 20, the first sliding unit 22 and the second sliding unit 23 operate as a first antenna element having a length of L2 (for example 100 mm). The ground pattern having a length of L2 (for example 90 mm) on the circuit board 4 operates as a second antenna element.

In a state where the first housing 1 and the second housing 2 are elongated, the metallic frame 20, the first sliding unit 22 and the second sliding unit 12, and the ground pattern on the circuit board 4 operate as a dipole antenna that includes larger antenna elements. This offers a broadband antenna with high antenna efficiency.

The sixth embodiment differs from the first embodiment in that power is supplied from the circuit board 4 to the sliding unit 21 including the first sliding part 22 provided in the first housing 1 and the second sliding part 23 provided in the second housing 2.

This application is based on the Japanese patent application (Japanese Patent Application 2005-060787) filed Mar. 4, 2005 and its content is herein incorporated as a reference.

INDUSTRIAL APPLICABILITY

As described above, the portable wireless device according to the invention includes a first housing and a second housing operating as a dipole antenna. The portable wireless device does not include an antenna protruding from the housing and thus ensures portability and delivers a high antenna performance despite its compact, low-profile and lightweight design. The portable wireless device is useful as a sliding type portable wireless device where two housings slide on each other in a telescopic fashion.

The invention claimed is:

1. A portable wireless device, comprising:
a first housing;
a second housing; and
a sliding unit for slidably coupling said first housing and said second housing to each other;
wherein said first housing is arranged a predetermined spacing apart from said second housing and includes a power feeding unit for feeding power between said first housing and said second housing; and
said sliding unit and said second housing operate as a dipole antenna.

2. A portable wireless device, comprising:
a first housing;
a second housing; and
a sliding unit for slidably coupling said first housing and said second housing to each other;
wherein said first housing is arranged a predetermined spacing apart from said second housing and includes a power feeding unit for feeding power between said first housing and said second housing;
said first housing and said second housing operate as a dipole antenna;
wherein said first housing includes a rail formed of a conductive metal for slidably supporting said second housing;
said second housing includes a power feeding unit including therein a circuit board having a ground pattern and feeding power between said rail and said circuit board;
said rail is arranged a predetermined spacing apart from the ground pattern on said circuit board, and
said rail and said ground pattern operate as a dipole antenna.

3. The portable wireless device according to claim 2, further comprising:
a plurality of said rails arranged a predetermined spacing apart from each other; and
a switching unit for selecting to electrically connect or electromagnetically couple a wireless part on said circuit board and one of the plurality of said power feeding unit to each other.

4. The portable wireless device according to claim 2, wherein said rail is electrically connected or electromagnetically coupled to an antenna element provided on said first housing.

5. The portable wireless device according to claim 4, wherein said sliding unit includes a first sliding part and a second sliding part made of a conductive metal and slidably coupled to each other, wherein said first sliding part is provided on said first housing and electrically connected to the end of said antenna element where the antenna element is overlaid on said second housing;
said second sliding part is provided on said second housing and is electrically connected to a power feeding part arranged with a predetermined spacing apart from the ground pattern on said circuit board and connected to a wireless circuit on said circuit board; and
said antenna element, said sliding unit and said ground pattern operate as an dipole antenna.

* * * * *